I. PELHAM.

Attaching Handles to Cross Cut Saws.

No. 5,339. Reissued March 25, 1873.

Witnesses;
Harrie C. Clark
R. N. Dyer

Inventor.
Isaac Pelham
by Dyer, Beadle & Co
Attys.

THE NORRIS PETERS CO., WASHINGTON, D. C.

UNITED STATES PATENT OFFICE

ISAAC PELHAM, OF ELMIRA, N. Y., ASSIGNOR TO EMANUEL ANDREWS.

IMPROVEMENT IN ATTACHING HANDLES TO CROSS-CUT SAWS.

Specification forming part of Letters Patent No. 30,153, dated September 25, 1860; reissue No. 5,339, dated March 25, 1873.

*To all whom it may concern:*

Be it known that I, ISAAC PELHAM, of Elmira, in the county of Chemung and State of New York, have invented an Improvement in Attaching Handles to Cross-Cut Saws; and I do hereby declare that the following is a full, clear, and exact description of the same, reference being had to the annexed drawing making a part of this specification, in which—

Figure 1:
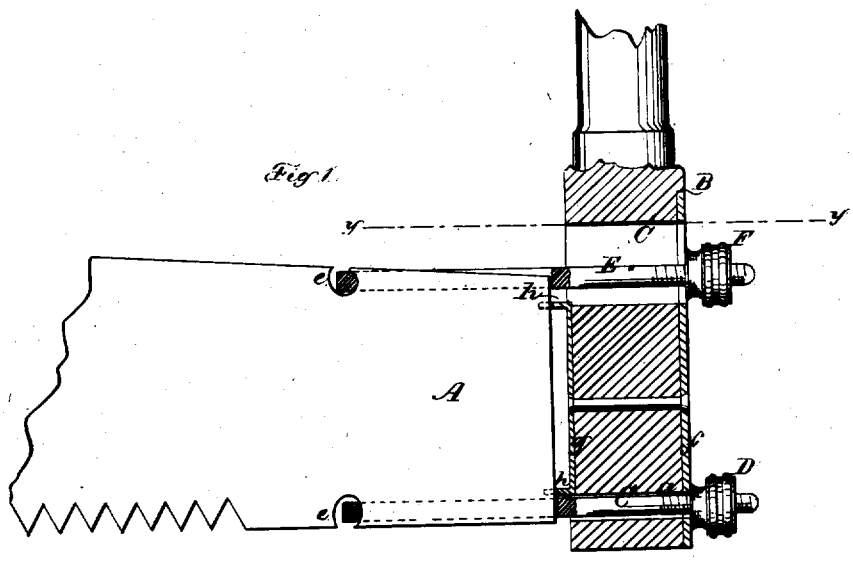
Figure 2:
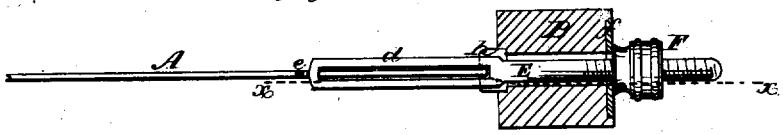

Figure 1 is a side elevation, partly in vertical section, shown by the line *x x*, Fig. 2, of a handle atttached to a saw according to my invention; and Fig. 2, a horizontal section of the same on the line *y y*, Fig. 1, viewed from above.

Similar letters of reference indicate corresponding parts in the two figures.

The object of this invention is to attach handles to the ends of a cross-cut saw in such a manner that they may be firmly secured to the saw, or readily removed, leaving the saw-blade without encumbrance and capable of being strained more or less tightly at pleasure against the ends of the saw-blade, and at the same time may be cheap of first cost and convenient in use; and the invention consists in attaching the handle by one of its sides to the extreme end of the saw-blade by means of rods so that it may be readily removed, replaced, or strained; and in the means employed for holding the extreme ends of the saw-blade firmly against one of the sides of the handle, all as more particularly hereinafter described.

To enable those skilled in the art to fully understand and construct my invention, I will proceed to describe it.

A represents one end of a cross-cut saw, and B its handle. This handle may be of wood, as usual, and at its lower part there is a slot, *a*, which extends entirely through the handle and is of sufficient dimensions to allow a rod, C, to pass through it, said rod having a screw on it, on which a thumb-nut, D, is fitted. Through the handle B, at a point some distance above the slot *a*, there is another slot *c*, having a screw-rod, E, passing through it, with a thumb-nut, F, on its outer end. The inner parts of the rods C E are slotted longitudinally, as shown at *d* in Fig. 2, the slots being of sufficient width to allow the saw to pass in so that the ends of the rods may fit or catch in notches *e e* in the upper and lower edges of the saw, as will be fully understood by referring to Fig. 1. The outer side of the lower part of the handle B has a metal plate, *f*, attached, against which the thumb-nuts D F will bear, and the inner side of the handle has a metal plate, *g*, attached, the ends of which are bent horizontally outward, and notched at *h* to receive the end of the saw.

From the above description it will be seen that by inserting the end of the saw in the notches *h h*, and fitting the inner ends of the rods C E in the notches *e e* in the saw, and then screwing up the thumb-nuts D F, the handle will be firmly secured to the saw and without the liability of working loose; and in case of such a contingency occurring, the handle may be readily made tight by screwing up the nuts D F, the handles being detached when necessary by unscrewing the nuts D F and moving the inner ends of the rods C E out from the notches *e e*.

By having the upper slot *c* of requisite depth the upper rod E may be adjusted vertically to suit saws of different widths.

Having thus fully described my invention, what I claim as new, and desire to secure by Letters Patent, is—

The combination of the handle to a cross-cut saw, attached by one of its sides to the extreme end of the saw-blade, and rods for securing the handle to the saw-blade, in the manner and for the purposes substantially as shown and described.

ISAAC PELHAM.

Witnesses:
JNO. T. DAVIDSON,
LYMAN L. LOWMAN.